United States Patent [19]

Mostert et al.

[11] 4,026,969
[45] May 31, 1977

[54] IMPACT IMPROVED POLYMERS

[75] Inventors: Simon Mostert, Cherry Hill; Richard O. Whitehead, Moorestown, both of N.J.

[73] Assignee: Shell Oil Company, Houston, Tex.

[22] Filed: Nov. 12, 1975

[21] Appl. No.: 631,352

Related U.S. Application Data

[63] Continuation of Ser. No. 524,119, Nov. 15, 1974, abandoned, which is a continuation-in-part of Ser. No. 388,512, Aug. 15, 1973, which is a continuation-in-part of Ser. No. 193,705, Oct. 29, 1971, abandoned.

[52] U.S. Cl. .......................................... 260/880 R
[51] Int. Cl.$^2$ .......................................... C08L 9/06
[58] Field of Search ............................... 260/880 R

[56] References Cited

UNITED STATES PATENTS

| | | | |
|---|---|---|---|
| 2,694,692 | 11/1954 | Amos | 260/880 R |
| 3,243,481 | 3/1966 | Ruffing | 260/880 R |
| 3,330,786 | 7/1967 | Finestone | 260/880 R |
| 3,658,946 | 4/1972 | Bronstert | 260/880 R |
| 3,676,527 | 7/1972 | Babcock | 260/880 R |

FOREIGN PATENTS OR APPLICATIONS

| | | |
|---|---|---|
| 1,002,902 | 9/1965 | United Kingdom |
| 1,109,681 | 4/1968 | United Kingdom |

*Primary Examiner*—Paul R. Michl

[57] ABSTRACT

Improved impact vinyl aromatic compositions are disclosed comprising interpolymers containing (A) from about two to about 25 parts by weight of a mixture of (1) a polybutadiene rubber with (2) a polyisoprene rubber in a weight ratio between 35:65 and 65:35; and (B) from about 98 to about 75 parts of at least one poly(monovinylaromatic) compound.

12 Claims, No Drawings

IMPACT IMPROVED POLYMERS

This is a continuation of application Ser. No. 524,119, filed Nov. 15, 1974, now abandoned.

This application is a continuation-in-part of patent application Ser. No. 388,512 filed Aug. 15, 1973 which was a continuation-in-part of patent application Ser. No. 193,705, filed Oct. 29, 1971, now abandoned.

This invention relates to improved impact poly(monovinylaromatic) compositions and to a process for preparing them. More particularly the invention relates to the discovery that interpolymers of certain rubbers, in a critical ratio, with vinyl aromatic compounds such as styrene result in unexpected increase in impact properties and enhanced rubber utilization.

It has long been known that the brittle nature of poly(monovinylaromatic) polymers such as polystyrene is overcome by incorporating a minor amount of rubber. The rubber is largely incompatible with the polymeric vinyl aromatic compounds resulting in a two-phase system comprising a dispersed rubbery phase and a poly(monovinylaromatic) matrix. Impact properties generally relate to the volume fraction of the rubbery phase and this volume fraction is reported as the weight ratio of the toluene insoluble gel in the finished polystyrene composition to the total rubber used. The prior art teaches that this quantity should range from about 3.5 to about 6.5 (N. R. Ruffing et al, U.S. Pat. No. 3,243,481 M. Baer, J Appl. Polymer Sci., 16 1109 (1972); H. Keskkula et al, Polymer Letters, 1,697 (1969); Encyclopedia of Polymer Technology, "Styrene Polymers",). Simple blending of the rubber into the poly(monovinylaromatic) compound gives a gel/rubber weight ratio essentially equal to 1. The amount of rubber employed in the composition adds to the cost for achieving desired impact properties. Methods that permit more efficient rubber utilization, i.e., at a gel/rubber ratio below the 3.5 ratio found necessary heretofore, are therefore highly desirable. This invention provides such a method.

It is known to dissolve unvulcanized elastomers such as synthetic polybutadiene into monomeric styrene followed by heating to a polymerization temperature to form a graft copolymer of the rubber and styrene. In this grafting, or interpolymerization technique, the volume fraction of the incorporated rubber is swelled by inclusions of polymeric monovinylaromatic compound, resulting in enhanced impact properties. Many processes are described in the literature for improving the utilization of the expensive rubber component.

The use of polymers of synthetic conjugated dienes, such as solution polybutadiene or polyisoprene, has been suggested; however, polybutadiene elastomers are generally superior to polyisoprene elastomers for improving impact strength.

It has been suggested to employ mixtures of rubbers for interpolymers in such patents as U.S. Pat. No. 2,694,692 to Amos et al and in British patent No. 1,002,902. Japanese patent No. 24178/67 discloses that as an impact modifier a small amount of polybutadiene can satisfactorily be replaced with polyisoprene. Netherlands patent application No. 6811577 discloses polymerizing styrene in the presence of certain elastomers including a copolymer of butadiene and isoprene.

It has now been discovered that compositions which are interpolymers of vinyl aromatic compounds with a mixture of (1) a synthetic polybutadiene rubber and (2) a synthetic polyisoprene rubber in a weight ratio of (1) to (2) between 35:65 and 60:35 parts by weight and having toluene insoluble gel/total rubber weight ratios of less than about 3.5 exhibit unexpected improvement in impact properties. This is particularly surprising since polyisoprene when interpolymerized with, e.g., styrene, exhibits only a small effect on impact strength compared to unmodified styrene homopolymer and since prior art teaches the desirability of much higher gel/rubber ratios. Another aspect of these compositions is that, depending upon the total amount of elastomer, the impact strength may be further enhanced by subsequent treatment. It has been found that for compositions according to the invention which contain up to about 6% by weight total rubber that the Izod impact strength increases during thermal treatment. Such enhancement has not been observed for these compositions containing above about 6% total rubber. However, for compositions containing 6% by weight total rubber and above, it has been discovered that the impact strength can be still further improved by mechanical working of the compositions. Such further improvement in impact strength by mechanical working has not been found in compositions according to the invention having total rubber contents below about 6% by weight. Accordingly, the compositions of the invention are particularly suitable for mechanical blending with other polymers, e.g., unmodified vinyl aromatic polymers, to achieve still greater rubber utilization. Thus, it is a primary object of the invention to provide improved poly(monovinylaromatic) compositions. Another object of the invention is to provide a method for making the improved compositions.

The monovinyl aromatic compounds which can be employed in producing the rubber modified polymers according to the invention include monovinyl aromatic compounds having the vinyl radical i.e., the ethylenically unsaturated radical, attached directly to a carbon atom of the aromatic nucleus. Styrene is the preferred monovinyl aromatic compound. Examples of other compounds applicable herein are the alkyl and dialkyl derivatives of styrene such as the dimethylstyrenes, ethylstyrenes, isopropylstyrenes, butyl-styrenes, etc.; the halogen derivatives of styrene, for example, chloro- and dichlorostyrene and the mono- and dibromostyrenes and alkylhalostyrenes as well as mixtures of these compounds with styrene or with each other. Alpha-methylstyrene may be substituted in a minor amount, for example 2 to 30% by weight, preferably from about 5 to 25% in the total composition for a portion of the monovinylaromatic monomer to improve properties of the interpolymers such as heat distortion temperature.

Broadly, the polymerized vinyl aromatic component comprises from about 75 to about 98% by weight of the final composition; in a more preferred aspect it comprises from about 88 to 96%.

The unvulcanized synthetic rubber materials used in preparing the interpolymer compositions according to the invention are polybutadiene (BR) and polyisoprene (IR) elastomers.

These homopolymers of butadiene and isoprene employed to prepare the interpolymers preferably have a cis-1,4 content from about 30 to about 99% by weight and more preferably from about 35 to about 96%. Polybutadienes having a 1,2 content less than about 15% are preferred; those having a 1,2 content less than about 12% are particularly preferred. Polyisoprenes having a cis 1,4 content above about 70% are especially preferred. The cis 1,4 contents of polybutadiene are conveniently determined by infrared technique on solution of the elastomer in carbon disulfide, e.g., according to the procedure of Silas et al., Analytical Chemistry, Volume 31, page 529 (1959).

For polyisoprene, the cis 1,4 contents are best determined by conventional nuclear magnetic resonance technique. The cis 1,4 form can be produced either by a lithium based catalyst, e.g., lithium metal or lithium alkyls, or by a Ziegler-type catalyst system such as heavy metal halides and alkylaluminum compounds, as is well known in the art.

Conventional linear rubbery polymers may be employed to prepare the compositions, however, nonlinear polymers prepared, for example, according to U.S. Pat. No. 3,551,392 to Snyder et al are preferred. These rubbery materials will have a molecular weight of at least about 20,000. Preferred are rubbers having an intrinsic viscosity in the range between about 1.9 to 8.0, and most preferably 2.0 to 3.6 dl/g in toluene at 30° C. Rubbers having a Mooney viscosity, ML-4, 212° F, in the range between about 30 and 70, particularly between 35 and 60, are especially suitable.

As shown in FIG. 1, the essential important feature of the invention is the use of a mixture of a polybutadiene elastomer with a polyisoprene elastomer in a weight ratio of polybutadiene to polyisoprene between 35 to 65 and 65 to 35, and preferably in a ratio between 40:60 and 60:40. It has been found that where the mixture of rubbers is used to prepare the high impact vinyl aromatic polymer compositions the product has unexpectedly good impact resistance. The optimum ratio between the polybutadiene elastomer and the polyisoprene elastomer will vary somewhat according to the particular rubbers and process conditions employed.

In accordance with the ASTM definition, an elastomer herein refers to a material that retracts within one minute to less than 1.5 times its original length after being stretched at room temperature (20° to 27° C) to twice its length and held for one minute before release.

As will be recognized by those skilled in the art, the unexpected enhancement in impact strength of the new interpolymers enables excellent rubber utilization. The term rubber utilization herein refers to a measurement of the amount of Izod impact strength at 23° C imparted by a unit weight of rubber in the modified polymonovinyl aromatic compound. It has been used as a convenient method of comparing the impact strengths of polystyrenes containing different amounts of rubber. The quantity, $$\frac{\text{Izod} - 0.20}{\text{Wt. \% Rubber}} \times 100,$$

is employed herein as a measure of rubber utilization. It is based on a definition of rubber utilization in E. R. Wagner et al., Rubber Chem and Tech, 43, 1129 (1970). The compositions of this invention have exhibited rubber utilization according to the above formula of from about 21 to 65, preferably from about 29 to about 65 depending upon prepolymer conversion and post treatment. This is contrasted with rubber utilization numbers of 19.5 to 19.1 for compositions having 100/0 to 80/20 BR/IR rubber ratio and 11.5 to 2.8 for compositions having 30/70 to 0/100 Br/Ir rubber ratio.

The interpolymers, according to the invention are prepared by mixing the polybutadiene elastomer and the polyisoprene elastomer with the vinyl aromatic monomer in the desired proportions and initiating the polymerization. Best results are obtained when the elastomers are dissolved with monomer prior to polymerization in a bulk polymerization process.

Antioxidants, chain regulators, lubricants, and fillers inert to the reaction can also be added. Examples of suitable antioxidants include 2,6-di-tert-butyl-4-methylphenol and trisnonylphenylphosphite, which may be added in amounts from about 0.1 to about 2% by weight of the total reaction mixture and preferably in amounts from about 0.25 to 1%. Light stabilizers such as 2-alkyl-2,3,4-benzotriazole may also be incorporated into the polymerization mass. Suitable chain transfer agents include sulfhydryl compounds, e.g., dodecylmercaptan and 2-mercaptoethanol. Preferred are alkyl mercaptans having from about 8 to 20 carbon atoms per molecule or mixtures of these which can be added to the reaction mixture in amounts from about 0.005 up to about 1% weight. The preferred concentration of mercaptan is from about 0.015 to about 0.05 weight percent. The polymerization may be carried out in the presence of small amounts of other compounds which are known to be useful in preparing molding compositions. This includes low concentrations of lubricants or flow agents such as mineral oil of a viscosity in the range of about 100 to 500 SSU, paraffin wax, petrolatum, polybutenes and the like in concentrations up to about 10% by weight of the total mixture, preferably in amounts of about 1 to about 5 weight percent, for improving both the processing and molding characteristics of the polymer product.

While the polymerization is generally carried out in the absence of a catalyst, it may sometimes be desirable to add a catalyst of the free radical generating type. Suitable polymerization catalysts of this type are peroxides such as benzoyl peroxide, di-tert-butylperoxide, t-butyl peroxypivalate, diethyl-peroxy-carbonate, t-butyl peracetate and others well known in the art which are generally added in concentrations from about 0.01 to 0.2% by weight of the polymerized monomers. Coloring agents which are inert to the polyermization may also be added.

The mixture is then subjected to conditions which will cause the vinyl aromatic compound to polymerize with the mixed rubbers in a bulk process. Good results are obtained by heating the solution to a temperature of from about 90° to about 200° C for a time sufficient to polymerize substantially all of the vinyl aromatic compound. The heating may be done without the addition of catalysts; the use of catalysts allows somewhat lower polymerization temperatures. Generally speaking, bulk polymerization for high impact compositions requires agitation for temperature control of the first polymerization stage and for proper dispersal of the rubbery material as it undergoes phase inversion, i.e., precipitates from the solution during this early polymerization step.

It has been found that, owing to the quite different behavior of the mixed elastomers, it may be necessary to employ somewhat different polymerization conditions than optimal when employing a single elastomer. By far the best results have been achieved in a batch process by adjusting pre-polymerization conditions to achieve large discrete elastomer particles.

After the polymerization is complete the product may contain a small amount, e.g., about 1 to 2% of unpolymerized monovinyl aromatic compound. As the presence of monomer has an adverse affect on impact properties, this is preferably removed by any of the known methods for removing residual monomer. Such methods include, e.g., subjecting the interpolymer to vacuum, e.g., in a devolatilizing extruder.

It is preferred that the interpolymer should have an intrinsic viscosity of at least 0.5 and preferably between 0.6 and 2.0.

Furthermore the interpolymer should have a toluene insoluble gel to total rubber weight ratio of less than about 3.5, preferably in the range of from about 1.65 to about 0.39, more preferably from about 1.0 to about 0.6.

A surprising aspect of the interpolymer compositions, according to the invention, is that for compositions containing from about 2 to about 6% by weight, preferably from about 3 to about 5% total elastomer, impact strength may be further enhanced by thermal treatment, i.e., by maintaining the polymeric product at a temperature in the range of about 230°–270° C, preferably about 250° C, for a time of at least about ten minutes, e.g., 20 to 60 minutes. As will be appreciated by those skilled in the art, shorter times at somewhat higher temperatures may also be employed. For compositions containing above about 6% by weight total rubber and where thermal treatment results in conventional loss of impact strength, it has been found that mechanical working, e.g., extruding, mill blending, kneading and the like, results in further enhancement of impact strength and improvement in rubber utilization compared to the "unworked" interpolymer composition. Generally, the mixture is milled, for example at a temperature between about 150° to 220° C for from about 5 minutes to about 10 hours, to develop full properties. The amount of mechanical working required to bring properties to optimum values will vary somewhat depending upon the exact composition of the product and the conditions under which it was prepared.

In order to better illustrate the invention the following examples are given.

EXAMPLE I

A polybutadiene having an intrinsic viscosity of 2.3 dl/g and containing about 35% cis 1,4 units, the remainder being trans 1,4 and 1,2 units, was dissolved in styrene to give a solution of 8% polybutadiene and 92% styrene. One hundred parts of this solution was then mixed with two parts of a white mineral oil available under the trade name ONDINA 935 as lubricant, and 0.3 parts of antioxidants which consisted of 0.1 part of 2,6-di-tert-butyl-4-methylphenol and 0.2 parts of tris-nonylphenylphosphite. The mixture was heated to 125° C with stirring to a conversion of 30%, as measured by the conventional pan-solids technique. The temperature was raised to 140° C; stirring was discontinued and polymerization was then continued by raising the temperature at a rate of 10° C per hour for 8 hours to a maximum of 220° C. The interpolymer product was milled for 5 minutes at 170° C to remove unreacted monomer; the specimens used for testing were compression molded in a six minute cycle using a pasadena press at about 195° C. The test data are shown in Table 1 and FIG. I.

EXAMPLE II

The above procedure was repeated wherein polybutadiene was replaced by increasing amounts of a linear polyisoprene rubber having an intrinsic viscosity of about 7 and containing about 91% cis 1,4 units, the remainder being trans 1,4 and 1,2 units. The styrene interpolymers possessed the properties as shown in Table I and FIG. I.

Table I

PROPERTIES OF STYRENE INTERPOLYMERIZED WITH 8% TOTAL MIXTURE OF POLYBUTADIENE AND POLYISOPRENE

| Example | Ratio of Polybutadiene to Polyisoprene | Toluene Insoluble Gel. % w | Ratio of Wt. Gel to Total wt. Rubber | Swell[1] Index | Izod Impact[2] ft-lb/in. at 23° C | Rubber Utilization[4] | Falling Wt.[3] Impact, Ft-lb/in. |
|---|---|---|---|---|---|---|---|
| I   | 100 : 0  | 26.9 | 3.36 | 10.2 | 1.66 | 19.5 | 48 |
| IIa | 90 : 10  | 17.4 | 2.18 | 10.2 | 1.62 | 19.0 | 51 |
| IIb | 80 : 20  | 15.1 | 1.89 | 12.5 | 1.63 | 19.1 | 62 |
| IIc | 65 : 35  | 13.2 | 1.65 | 13.5 | 2.03 | 24.0 | >80* |
| IId | 50 : 50  | 7.0  | .88  | 14.2 | 2.43 | 29.0 | >80* |
| IIe | 35 : 65  | 3.1  | .39  | 13.7 | 1.79 | 21.0 | >80* |
| IIf | 0 : 100  | 0    | 0    | —    | 0.32 | 2.8  | 5.6 |

[1]Swell index is ratio of weight of gel swollen with toluene, but free of supernatant toluene to weight of gel after evaporation of al toluene.
[2]ASTM D-256-56.
[3]A hammer, similar to that of the Gardiner Falling Weight impact tester hits a test specimen in a vertical position, with a constant energy of 5 ft. lbs. and the residual energy measured.
The test specimen is 1⅞" × 1⅞" × 60 mils compression molded between polished plates and conditioned at 150° F for 24 hours before testing. The data are treated in the same manner as ASTM D-256-65.
[4] $\frac{\text{Izod Impact} - 0.10}{\text{Wt. \% Rubber}} \times 100$

*Maximum reading on test apparatus.

The unusual nature of the compositions according to the invention may be seen by comparing impact strength for these interpolymers. Example I employing 100% polybutadiene exhibits good impact strength. Example IIf employing 100% polyisoprene exhibits only very low impact strength. Examples IIa and IIb illustrate that no significant advantage in impact strength is obtained by replacement of small amounts of polybutadiene with polyisoprene. However, Examples IIc, d and e, according to the invention exhibit a surprisingly large increase in impact strength. This discovered large increase in impact strength unexpectedly results from blends of poor impact modifier (Example IIf) with a good impact modifier (Example I) within certain ratios. Another unusual aspect of the compositions according to the invention is that gel content, which often varies directly with impact strength for elastomer modified poly(monovinylaromatic) compositions, is found to be lower than, e.g., Example I based upon 100% polybutadiene.

EXAMPLE III

Table II

| | THERMAL STABILITY OF INTERPOLYMERS | | | |
|---|---|---|---|---|
| | EXAMPLE IV | RUBBER UTILIZATION | EXAMPLE V | RUBBER UTILIZATION |
| Total Elastomer in Interpolymer | 5% | | 4% | |
| Izod Impact strength ft lb/in. | | | | |
| Base case* | 1.01 | 18.2 | 0.88 | 19.5 |
| 20 min at 480° | 1.40 | 26.0 | 1.21 | 27.8 |
| 40 min | 1.36 | 25.2 | 1.17 | 26.8 |
| 60 min | 1.28 | 23.6 | 1.02 | 23.0 |

*Pressed 1 minute at 380° F

The procedure of Example I was repeated except that 50% of the polybutadiene was replaced with a non-linear polyisoprene having an intrinsic viscosity of 3.1 and cis 1,4 content of about 85% by weight. Test bars molded from the resulting interpolymer had an Izod impact strength of 3.01 ft lb/in. of notch at 23° C.

EXAMPLE IV

The procedure of Example III was repeated except that a smaller total amount (5% by weight) of mixed elastomers was used. The ability of this impact composition to withstand exposure to higher temperature was tested. A sample of the polymer was held in a mold between two platens heated to 30° C for one minute to provide a "base case". This procedure was repeated with three additional samples of the polymer except that the temperature of the platens was raised to 480° and holding time increased as shown in Table II. As may be seen the Izod impact strength increases during thermal treatment. Such an effect was not found, however, for samples of the polymer according to Example III which contained 8% by weight total rubber, in fact, some loss of impact strength was found.

EXAMPLE V

The procedure of Example IV was repeated except that the total isoprene rubber was replaced with a non-linear polyisoprene rubber having an intrinsic viscosity of about 3.1 and cis 1,4 content of about 75% by weight, and the total amount of mixed elastomers was 4% by weight. Resulting thermal stability data are shown in Table II.

EXAMPLE VI

The procedure of Example II was repeated except the polyisoprene rubber had an intrinsic viscosity of 3.1 and the prepolymer conversion was varied as shown. The styrene interpolymers possessed the properties as shown in Table III.

Those skilled in the art will recognize that rubber utilization obtained in the composition of this invention are dramatically higher than those of known polystyrene polymers. Only in the case of acrylonitrile/-Butadiene/Styrene ABS polymers (where the polar monomer has been incorporated into the styrene matrix) have comparable rubber utilizations been obtained.

Table III

EFFECT OF IR/BR RATIO ON TOUGHNESS OF HIGH IMPACT POLYSTYRENE
Batch Prepolymerization
Total Rubber, 8.0%
Kaydal White Mineral Oil, 2.0 phr

| Ratio IR[b]/Br | Conversion,[a] % | Izod, Ft-lb/in Unmilled | RU[c] | Milled | RU[c] | Gel% | Ratio of Gel wt. to Total Rubber wt. | Swell Index |
|---|---|---|---|---|---|---|---|---|
| 40/60 | 23 | 1.95 | 23 | 2.45 | 29.4 | — | — | — |
| | 25 | 2.03 | 24 | 2.85 | 34.4 | — | — | — |
| | 30 | 2.34 | 28 | 3.19 | 38.6 | 7.4 | .93 | 17.2 |
| 50/50 | 24 | 2.09 | 24.9 | 3.15 | 38.1 | — | — | — |
| | 29 | 2.43 | 29 | 3.68 | 44.8 | — | — | — |
| | 35 | 2.57 | 30.9 | 3.80 | 46.3 | — | — | — |
| 60/40 | 25 | — | — | 4.08 | 49.8 | 4.9 | .61 | 15.5 |
| | 31 | — | — | 4.55 | 55.6 | — | — | — |
| | 39 | — | — | 5.36 | 65.8 | 5.5 | .69 | 14.5 |
| 70/30 | 25 | — | — | 1.02 | 11.5 | — | — | — |
| | 30 | — | — | 0.61 | 6.4 | — | — | — |
| | 38 | — | — | 0.80 | 8.8 | — | — | — |
| 100/0 | 27 | — | — | 0.29 | 2.4 | — | — | — |
| | 33 | — | — | 0.28 | 2.3 | — | — | — |
| | 38 | — | — | 0.26 | 2.0 | — | — | — |

[a] Prepolymer conversion
[b] IR-1000 IV=3.1 - CIS content 70–75% by NMR
[c] RU = Rubber Utilization = $\frac{\text{Izod value} - 0.2}{\text{Wt. \% Rubber}} \times 100$

What is claimed is:

1. A graft copolymer composition having a toluene insoluble gel/total rubber weight ratio in the range of from about 1.65 to about 0.39 and a rubber utilization of from about 21 to about 65, consisting essentially of from about 4 to 12 parts by weight of a mixture of (1) polybutadiene elastomer and (2) polyisoprene elastomer in a weight ratio of (1) to (2) between 35:65 and 65:35 and from about 96 to about 88 parts by weight of polymerized styrene.

2. A composition according to claim 1 wherein the rubber utilization is at least about 29 and said weight ratio of polybutadiene elastomer to polyisoprene elastomer is in the range from 40:60 to 60:40.

3. In the process for preparing an impact modified poly(vinyl aromatic) composition comprising bulk thermal polymerizing of from about 2 to about 25 parts of rubber dissolved in about 98 to about 75 parts of a feed in which the the sole polymerizable monomer component consists essentially of one or more monovinyl aromatic compounds at a temperature in the range from about 90° to about 200° C, with agitation until the reaction mixture has undergone phase inversion, for a time sufficient to polymerize substantially all of the monovinyl aromatic compound and removing residual monomers to form an interpolymer containing discrete gelled rubber particles, the improvement which comprises using as the rubber a mixture of polybutadiene elastomer and polyisoprene elastomer in a weight ratio of polybutadiene to polyisoprene between 35:65 and 65:35 to form an interpolymer having a toluene insoluble gel/total rubber weight ratio in the range of from about 1.65 to about 0.39.

4. The improved process of claim 3 wherein the feed monomer is styrene and the rubber content is no more than about 6 percent by weight, which comprises the additional step of maintaining the interpolymer at a temperature above about 225° C for a period of at least about 10 minutes.

5. The improved process of claim 3 wherein the feed monomer is styrene and the rubber content is greater than 6 percent by weight, which comprises the additional step of mechanically working the interpolymer at a temperature between about 150° and 270° C for a period of from about five minutes to about ten hours, resulting in interpolymer with a rubber utilization value in the range from about 21 to about 65.

6. In the process for preparing an impact modified poly(vinyl aromatic) composition comprising bulk thermal polymerizing of from about 2 to about 25 parts of a rubber dissolved in about 98 to about 75 parts of a feed in which the sole polymerizable monomer component consists essentially of one or more monovinyl aromatic compounds at a temperature in the range from about 90° to about 200° C, with agitation until the reaction mixture has undergone phase inversion and continuing polymerization without agitation for a time sufficient to polymerize substantially all of the monovinyl aromatic compound and removing residual monomers to form an interpolymer containing discrete gelled rubber particles, the improvement which comprises using as the rubber a mixture of polybutadiene elastomer and polyisoprene elastomer in a weight ratio of polybutadiene to polyisoprene between 35:65 and 65:35 to form an interpolymer having a toluene insoluble gel/total rubber weight ratio in the range of from about 1.65 to about 0.39.

7. The improved process of claim 6 wherein the feed monomer is styrene and the rubber content is no more than about 6 percent by weight which comprises the additional step of maintaining the interpolymer at a temperature above about 225° C for a period of at least about 10 minutes.

8. The improved process of claim 6 wherein the feed monomer is styrene and the rubber content is greater than 6 percent by weight, which comprises the additional step of mechanically working the interpolymer at a temperature between about 150° and 270° C for a period of from about 5 minutes to about ten hours, resulting in an interpolymer with a rubber utilization value in the range from about 21 to about 65.

9. A process according to claim 5 wherein said feed monomer is styrene, said weight ratio of polybutadiene elastomer to polyisoprene elastomer is in the range from 40:60 to 60:40, and the rubber utilization of the resulting interpolymer is in the range from about 29 to about 65.

10. A process according to claim 5 wherein said weight ratio of polybutadiene elastomer to polyisoprene elastomer is in the range from 40:60 to 60:40 and the rubber utilization of the resulting interpolymer is at least about 29.

11. A process according to claim 6 wherein said feed monomer is styrene, said weight ratio of polybutadiene elastomer to polyisoprene elastomer is in the range from 40:60 to 60:40, and the rubber utilization of the resulting interpolymer is in the range from about 29 to about 65.

12. A process according to claim 5 wherein said weight ratio of polybutadiene elastomer to polyisoprene elastomer is in the range from 40:60 to 60:40 and the rubber utilization of the resulting interpolymer is at least about 29.

* * * * *